ABSTRACT OF THE DISCLOSURE

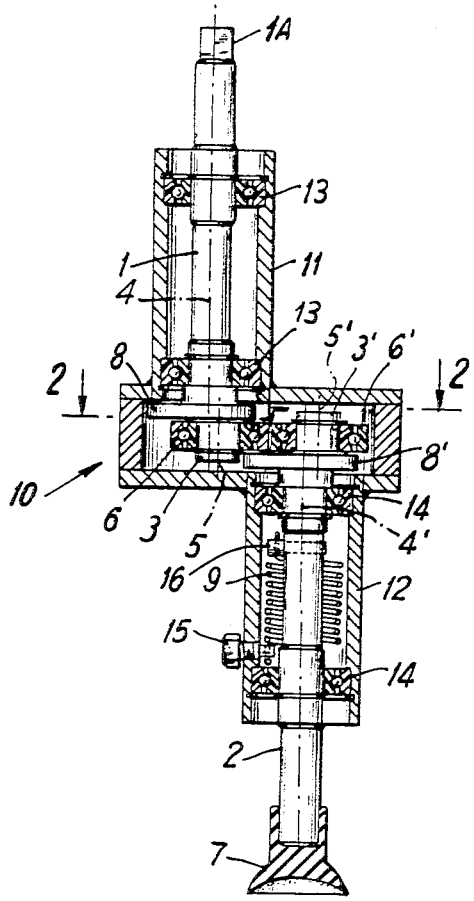
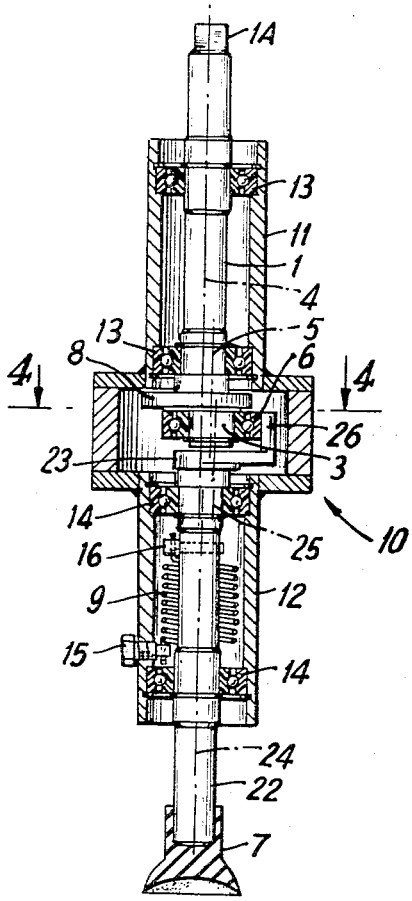
FIG. 1
FIG. 3
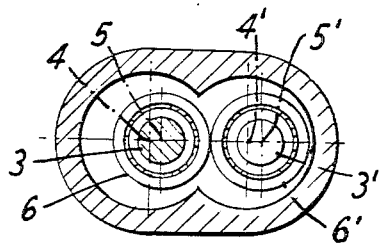
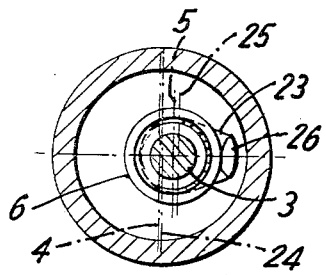
FIG. 2
FIG. 4
INVENTORS
JOSÉ VIVAS CIURANA
VICENTE VIVAS CIURANA
BY
*McGlew & Toren*
ATTORNEYS 3,413,763
DEVICE FOR GRINDING ENGINE VALVES
José Vivas Ciurana and Vicente Vivas Ciurana, both of
Calle Orfebres Santacatalina, 14–16, Castellon, Spain
Filed Nov. 6, 1964, Ser. No. 409,458
Claims priority, application Spain, Feb. 6, 1964,
104,040, 104,041
8 Claims. (Cl. 51—29)

The disclosure is directed to a valve grinder having a housing with a driving shaft and a driven shaft rotatably mounted therein for angular displacement about respective axes which are substantially parallel. One end of the driving shaft is formed for coupling to driving means, such as an electric motor or the like, and the outer end of the driven shaft is formed for coupling to a valve to be ground. The inner end of each shaft carries a respective bearing, and each bearing is eccentric to the axis of its respective shaft. One of these bearings is tangentially engageable with the other, and the respective eccentricities of the bearings differ from each other. In another embodiment of the invention the bearing on the driving shaft is an anti-friction bearing and has an outer race which is engageable with an eccentric axially extending bearing member on the inner end of the driven shaft. With the arrangement of the invention, when the driving shaft is rotated about its axis, the driven shaft is oscillated about its axis and, due to the relative difference in the respective eccentricities of the bearings, the tangential engagement therebetween is interrupted at a predetermined point during each oscillation of the driven shaft in one respective angular direction. Means, in the form of a torsion spring, are coupled to the driven shaft and are operable, during interruption of the tangential engagement, to oscillate the driven shaft in the opposite angular direction.

BACKGROUND OF THE INVENTION

The invention is directed to a valve grinder especially useful for grinding the valves of internal combustion engines.

In engine shops, valves are usually ground by hand but under conditions which may be considered to be detrimental to personnel.

Absent a valve grinder of the present invention, a worker manually grinds a valve by rotating a rod fixed to one of the valve. The valve has previously had a layer emery applied to its seating surface and the circular or oscillatory movement which the worker gives to the valve is produced by friction between the rod and the palms of his hands.

This manual operation is costly and furthermore does not produce good results except infrequently. For a grinding operation to be imprecise, it is only necessary to have a very superficial pitting, as this may produce an irregular operation of the valve which is reflected in the operation of the engine.

SUMMARY OF THE INVENTION

The invention is directed to valve grinders and, more particularly, to a novel valve grinder which is free of the disadvantages of prior art valve grinders and is simple in construction and economical in operation.

In accordance with the invention, the valve grinder comprises two shafts, one a driving shaft and the other a driven shaft. with the outer end of the driving shaft being arranged for coupling to a driving means and the outer end of the driven shaft being arranged for coupling to a valve to be ground. The inner end of each shaft has a shaft portion which is eccentric to the axis of the respective shaft, and the eccentricity is different for the two shafts. Each eccentric shaft end carries a bearing, and at least one of these bearings is an anti-friction bearing having an outer race. In one embodiment of the invention, both bearings are anti-friction bearings and their outer races are arranged to be tangentially engageable.

In another embodiment of the invention, the bearing on the driving shaft is an anti-friction bearing whereas the bearing on the driven shaft comprises a radially offset and axially outwardly extending bearing member on the driven shaft. This bearing member is engageable tangentially with the outer race of the anti-friction bearing on the driving shaft.

Due to the difference in the relative eccentricities of the two bearings, the tangential engagement therebetween is interrupted at a predetermined point during each oscillation of the driven shaft in one respective angular direction. Means are coupled to the driven shaft and are operable, during such interruption of the tangential engagement to oscillate the driven shaft in the opposite angular direction. This means preferably comprises a torsion spring embracing the driven shaft and having one end anchored to a housing and the other end anchored to the driven shaft. The interruption of the tangential engagement provides a "friction jump" or "friction escape" between the two bearings, during which the torsion spring is effective as mentioned.

An object of the invention is to provide an improved valve grinder.

Another object of the invention is to provide an improved valve grinder in which coupling between the driving and the driven shaft is effected by tangential engagement between bearings, one on each shaft, and with each bearing being eccentric relative to the axis of its associated shaft.

A further object of the invention is to provide a valve grinder, as just described, in which the relative eccentricities of the two bearings differ from each other.

Still another object of the invention is to provide a valve grinder of the type mentioned in which both bearings are anti-friction bearings.

A further object of the invention is to provide a valve grinder of the type mentioned in which one bearing is an antifriction bearing having an outer race, and the other bearing is an axially outwardly extending, radially offset bearing member on the inner end of one of the shafts.

An ancillary object of the invention is to provide such a valve grinder in which each shaft carries a counter weight, with each counter weight being eccentric to the axis of its respective shaft but in a direction diametrically opposite to the direction of eccentricity of the associated bearing.

Brief description of the drawings

For an understanding of the principles of the invention, reference is made of the following description of typical embodiments thereof as illustrated in the accompanying drawings.

In the drawings:

FIG. 1 is a longitudinal sectional view through one form of valve grinder embodying the invention;

FIG. 2 is a sectional view taken essentially on the line 2—2 of FIG. 1;

FIG. 3 is a longitudinal sectional view through another form of valve grinder embodying the invention; and FIG. 4 is a sectional view taken essentially on the line 4—4 of FIG. 3.

Description of the preferred embodiments

Referring first to the embodiment of the valve grinder shown in FIGS. 1 and 2, a housing, generally indicated at 10, is provided with oppositely directed substantially tubular extensions 11 and 12 which are offset from each other and which have axes which are substantially parallel to each other. Axially spaced bearings 13 in extension 11 rotatably support a driving shaft 1 having an axis 4 and an outer end 1A formed for coupling to a suitable driving means such as, for example, an electric motor or the like. Similarly, axially spaced bearings 14 in extension 12 rotatably support a driven shaft 2 having an axis 4' and having a suction disk 7, or other suitable means, on its outer end for coupling to a valve to be ground.

The inner end of driving shaft 1 is formed with an offset shaft portion 3 which has an axis 5 which is substantially parallel to the axis 4, the axis 5 being eccentric with respect to the axis 4. Also, the inner end of driven shaft 2 has an offset or eccentric shaft portion 3' having an axis 5' which is parallel to the axis 4' and eccentric with respect to the axis 4'. As will be clear from FIGS. 1 and 2, the eccentricity of axis 4 and 5 is less than the eccentricity of axes 4' and 5'. Shaft portion 3 rotatably carries a bearing 6 which is a usual type of anti-friction bearing including anti-friction elements rotatable between inner and outer races, and a substantially identical bearing 6' is rotatable on shaft portion 3'. The outer races of bearings 6 and 6' are so disposed as to be tangentially engageable with each other.

Shafts 1 and 2 also carry counter weights 8 and 8', respectively, each of which is eccentric with respect to the axis of its associated shaft. However, the direction of eccentricity of the counter weights 8 and 8' is opposite to the direction of eccentricity of the associated shaft portion 3 and 3', respectively. Counter weights 8 and 8' assist the maintenance of proper relative movement of the shafts 1 and 2. Driven shaft 2 is embraced by the torsion spring 9 which has one end connected to a pin or the like 15 secured in extension 12 and its opposite end connected to a pin 16 mounted in shaft 2.

The arrangement of FIGS. 1 and 2 operates in such a manner that, as shaft 1 is rotated by a suitable motor or the like coupled to its outer end 1A, shaft 2 is oscillated about its axis 4'. The transformation of the rotary motion of shaft 1 about its axis 4 into oscillation of shaft 2 about its axis 4' is effected by the rolling, tangential and essentially frictionless interengagement between the outer races of the bearings 6 and 6'. Thus, the conversion of the rotary motion into an oscillatory motion is effected in a simple, economical and efficient manner, and with long life of the associated parts due to the provisions of the antifriction bearings.

However, and due to the difference in the relative eccentricities of the bearings 6 and 6', the tangential engagement between the outer races of the bearings is interrupted at a predetermined point during each oscillation of driven shaft 2 in one respective angular direction. At this time, the torsion spring 9, coupled between extension 12 and shaft 2, oscillates driven shaft 2 in the opposite angular direction. The relative degree of oscillation of shaft 2 is precisely determined by the difference between the relative eccentricities of the shaft portions 3 and 3'. As can be readily seen from FIG. 2 the maximum separation between the outer races of the bearings 6 and 6' is preferably of the order of 0.5 mm.

In the embodiment of the invention illustrated in FIGS. 3 and 4, the same reference characters have been used to identify parts which are identical with corresponding parts of the valve grinder shown in FIGS. 1 and 2. Referring to FIGS. 3 and 4, the driving shaft 1 therein with is associated bearings, shaft portion and counter weight is identical with the driving shaft 1 of FIGS. 1 and 2, and housng 10 is identical with the housing 10 of FIGS. 1 and 2.

The driven shaft 22 has an axis 24 and its inner end has an eccentric shaft portion 23 which has an axis 25 offset from axis 24. Shaft portion 23 has a radially offset and axially extending bearing member 26 which is essentially elliptical in top plan, as viewed in FIG. 4, and bearing member 26 engages the outer race of anti-friction bearing 6, which is rotatable about eccentric shaft portion 3. Again, as seen in FIG. 4 particularly, the difference in the eccentricities of the eccentric shaft portions of the two shafts is of the order of 0.5 mm.

The arrangement of FIGS. 3 and 4 operates in the same manner as does the arrangement of FIGS. 1 and 2, with bearing member 26 being tangentially engageable with the outer race of anti-friction bearing 6. Thereby, rotation of driving shaft 1 about its axis 4 causes an oscillation of driven shaft 22 about its axis 24.

The valve grinder of the invention has numerous advantages in industrial applications, due to its simple construction, ease of use and reliability and long life of parts. Using the valve grinder of the invention, a finished grinding of high quality can be attained in a single operation.

While specific embodiment of the invention have been shown and described in detail in order to illustrate the application of the principles of the invention, it will be understood that invention may be embodied otherwise without departing from such principles.

What is claimed is:

1. A valve grinder comprising, in combination, a housing; a driving shaft and a driven shaft rotatably mounted in said housing for angular displacement about respective axes which are substantially parallel; an end of said driving shaft being formed for coupling to driving means, and an end of said driven shaft being formed for coupling to a valve to be ground; a first bearing on said driving shaft; a second bearing on said driven shaft; each of said bearings being eccentric to the axis of its respective shaft and one of said bearings being tangentially engageable with the other, at least one of said bearings being an anti-friction bearing having an outer race rotatable about an axis parallel and eccentric to the axis of the associated shaft, tangentially engageable with the other bearing and rotatable along the surface of the other bearing; whereby said driven shaft is oscillated about its axis responsive to rotation of said driving shaft about its axis; and means coupled to said driven shaft and biasing the same in an angular direction to establish said tangential engagement, the return movement of the driven shaft under the bias of said spring being limited by engagement of said second bearing with said first bearing.

2. A valve grinder, as claimed in claim 1, in which the respective eccentricities of said bearings differ from each other, whereby the tangential engagement between said bearings is interrupted at a predetermined point during each oscillation of said driven shaft in one respective angular direction, said last-named means being operable, during interruption of said tangential engagement to oscillate said driven shaft in the opposite angular direction.

3. A valve grinder, as claimed in claim 2, in which said coupled means comprises a torsion spring surrounding said driven shaft and connected at one end to said housing and at the opposite end to said driven shaft.

4. A valve grinder, as claimed in claim 1, in which both of said bearings are anti-friction bearings having outer races tangentially engageable with each other.

5. A valve grinder, as claimed in claim 1, in which said bearings are on the inner ends of said shafts.

6. A valve grinder, as claimed in claim 5, in which both of said bearings are anti-friction bearings having outer races tangentially engageable with each other.

7. A valve grinder, as claimed in claim 6, in which the other bearing comprises a radially offset axially outwardly directed bearing member on said driven shaft.

8. A valve grinder, as claimed in claim 1, including two respective counter weights, one on said driving shaft and the other on said driven shaft; each counter weight being eccentric to the axis of its respective shaft, and each counter weight having a direction of eccentricity substantially diametrically opposed to the direction of eccentricity of the associated bearing.

References Cited

UNITED STATES PATENTS

| | | | |
|---|---|---|---|
| 959,653 | 5/1910 | Townsend | 51—29 |
| 1,300,669 | 4/1919 | Stenman | 51—29 |
| 1,313,490 | 8/1919 | Larson | 51—29 |
| 1,709,428 | 4/1929 | Carpenter | 51—29 |
| 2,434,463 | 1/1948 | Klein | 51—29 |
| 876,449 | 1/1908 | Fry | 51—29 X |

FOREIGN PATENTS 934,714  1/1948  France.

LESTER M. SWINGLE, *Primary Examiner.*